Patented Oct. 25, 1938

2,134,415

UNITED STATES PATENT OFFICE 2,134,415

MANUFACTURE OF OXIDE COATED CATHODES

Imre Patai, Budapest, Hungary, assignor to N. V. Philips Gloeilampenfabrieken, Eindhoven, Netherlands No Drawing. Application April 16, 1936, Serial No. 74,812. In Hungary April 16, 1935

2 Claims. (Cl. 250—27.5)

For the purpose of producing for electron discharge tubes incandescent cathode coatings consisting of the oxides of alkaline earth metals, the surfaces to be coated with the oxide layer are first coated with the carbonates of the alkaline earth metals and the carbonates are converted by heating into oxides. From the carbonates are prepared disperse systems, suspensions, or colloidal solutions from which the surface layer is produced by immersion, spraying, painting or cataphoresis. The carbonate dispersions required for this purpose were hitherto prepared primarily by mechanically grinding the carbonate as in a ball mill. The disadvantage of this method is that as the fineness of the dispersion is increased, the duration of the grinding as well as the cost and the quantity of the deleterious impurities received by the dispersion from the grinding bodies are increased.

According to a second, non-mechanical method, the hydroxide necessary for the preparation of the carbonate is ground instead of the carbonate itself. A methyl alcohol suspension thereof is converted, by the introduction of dry carbon dioxide, into a suspension of alkaline earth metal carbonate which contains dimethyl carbonic acid and which after filtering, washing with ether, and drying is mixed with a quantity of water exceeding the weight equivalent. The alkaline earth carbonate produced is peptized in the water for a fairly long time so that the solution contains above the coarser carbonate suspension separated out from 3 to 5% of colloidal alkaline earth carbonates in solution. During the cataphoresis, however, the carbonate separates out from the colloidal solution thus prepared as a gel containing water and when dried on the cathode exhibits cracks and consequently loses its continuity. This disadvantage can only be obviated by separating the carbonate layer by an electrophoretic agency comprising an extremely dilute solution of 0.8–1% colloidal carbonate and having a very low current density, for example 0.8–1 milliampere per square centimeter. This delays the treatment since it is possible to separate out of barium carbonate in ten minutes only 0.003 gram of precipitate per square centimeter. In addition the preparation of this colloid is comparatively complicated and requires great care.

This invention obviates the above-mentioned disadvantages by separating the carbonate dispersion, which serves as the coating, by means of carbon dioxide out of a solution of the soluble chemical compound of alkaline earth metal, for example the hydroxide thereof, in a liquid in which carbonates are not dissolved as in an aqueous solution.

When the hydroxide is not dissolved in water but, for example, in anhydrous alcohol, use is made of crystallized hydroxide or hydroxide containing water of crystallization.

The gaseous carbon dioxide is mixed with the hydroxide solution either by simply introducing the carbon dioxide at atmospheric pressure into the hydroxide solution or by bringing the carbon dioxide into contact with the solution, in an enclosure under pressure. As an alternative, the hydroxide solution may be introduced in finely divided form into an enclosure containing carbon dioxide which is at atmospheric pressure or at a higher pressure.

The carbon dioxide may be united as a water solution with the hydroxide solution at atmospheric or at a higher pressure. Thus, the separation is continuous and can be carried out in practice for example, by causing the solutions which are under pressure to flow in alternate concentric layers through Venturi nozzles into a vessel at atmospheric pressure.

The concentration of the carbonate dispersion produced can be increased by increasing the concentration of the solution of the alkaline earth metal compound initially used. For this purpose warm solutions of alkaline earth metals are used for the preparation of strongly concentrated carbonate dispersions. The fineness of the dispersion produced can be regulated by altering the conditions of the separation, such as concentration, temperature, duration of the separation and by agitating the solution to a greater or less extent. In preparing very fine dispersions, the viscosity of the liquid, compared to that of water, may be increased, preferably, by the addition of glycerine or glycol which may also be used as a solvent, or by the use of anhydrous glycerine as a solvent. When the solvent consists of one part of water and from 3 to 4 parts of glycerine, the carbonate separated out may be of colloidal fineness.

By the method described, colloidal dispersions of concentrations as high as 25% of carbonate, may be obtained. They are pasty and can be diluted with water to the desired consistency. Even 4% dispersions are adapted for electrophoretic separation and it is possible to separate out of it in 1 to 2 minutes .003 grams per square centimeter of barium carbonate at 10 milliamperes current density. The coatings separated from the dispersions above described have, probably because they are not hydrated gels, such a structure that even after a heat treatment they do not crack or peel.

What I claim is:—

1. The method of manufacturing oxide coated cathodes comprising mixing an anhydrous solvent of the group consisting of glycol and glycerine, and a compound of an alkaline earth metal soluble in said anhydrous solvent, introducing carbon dioxide into the mixture to disperse carbonate particles of the alkaline earth metal, diluting to the desired constituency by adding water, submerging a cathode to be coated in the solvent and passing a current through the cathode and the solvent to cataphoretically deposit said particles on the cathode and heating said cathode to decompose the carbonate and leave a coating of alkaline earth metal oxide.

2. A method for production of alkaline earth carbonate layers convertible to an oxide on a refractory metal cathode comprising mixing an alkaline earth metal compound in a polyhydric alcohol solvent of the group consisting of glycol and glycerine which do not dissolve the carbonate of said compound and which have a viscosity greater than water, converting said compound to an alkaline earth metal carbonate and dispersing said carbonate particles through the solvent, and covering said cathode with a coating of said carbonate cataphoresis.

IMRE PATAI.